(12) United States Patent
Park et al.

(10) Patent No.: US 8,180,184 B2
(45) Date of Patent: May 15, 2012

(54) ABSORPTION MODULATOR AND MANUFACTURING METHOD THEREOF

(75) Inventors: Jeong Woo Park, Daejeon (KR); Jongbum You, Seongnam-si (KR); Gyungock Kim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 393 days.

(21) Appl. No.: 12/504,607

(22) Filed: Jul. 16, 2009

(65) Prior Publication Data

US 2010/0142878 A1 Jun. 10, 2010

(30) Foreign Application Priority Data

Dec. 10, 2008 (KR) .................... 10-2008-0125330

(51) Int. Cl.
*G02F 1/035* (2006.01)
(52) U.S. Cl. .......................................... 385/2
(58) Field of Classification Search ................ 385/2
See application file for complete search history.

(56) References Cited

U.S. PATENT DOCUMENTS

| | | | | |
|---|---|---|---|---|
| 5,563,902 A | * | 10/1996 | Xu et al. ................ | 372/50.11 |
| 6,198,118 B1 | * | 3/2001 | Holcombe ................ | 257/292 |
| 6,928,223 B2 | * | 8/2005 | Walpole et al. ................ | 385/131 |
| 6,999,219 B2 | | 2/2006 | Manassen et al. | |
| 6,999,670 B1 | | 2/2006 | Gunn, III et al. | |
| 7,102,807 B2 | * | 9/2006 | Shi et al. ................ | 359/245 |
| 7,340,709 B1 | * | 3/2008 | Masini et al. ................ | 716/52 |
| 7,609,376 B2 | * | 10/2009 | Wang et al. ................ | 356/301 |
| 2002/0070388 A1 | * | 6/2002 | Greenberg et al. ................ | 257/122 |
| 2006/0030084 A1 | * | 2/2006 | Young ................ | 438/149 |
| 2010/0032763 A1 | * | 2/2010 | Pillarisetty et al. ................ | 257/366 |

FOREIGN PATENT DOCUMENTS

| | | | |
|---|---|---|---|
| JP | 6-67244 | * | 3/1994 |
| JP | 08-248364 A | | 9/1996 |
| KR | 1020060067130 A | | 6/2006 |

OTHER PUBLICATIONS

Carlos Angulo Barrios et al., "Low-Power-Consumption Short-Length and High-Modulation-Depth Silicon Electrooptic Modulator," Journal of Lightwave Technology, Apr. 2003, pp. 1089-1098, vol. 21, No. 4.
G.V.Treyz et al., "Silicon Optical Modulators at 1.3 μm Based on Free-Carrier Absorption," IEEE Electron Device Letters, Jun. 1991, pp. 276-278, vol. 12, No. 6.
William M.J. Green et al., "Ultra-compact, low RF power, 10 Gb/s silicon Mach-Zehnder modulator," Optics Express, Dec. 10, 2007, pp. 17106-17113, vol. 15, No. 25.

\* cited by examiner

*Primary Examiner* — Charlie Peng

(57) ABSTRACT

An absorption modulator is provided. The absorption modulator includes a substrate, an insulation layer disposed on the substrate, and a waveguide having a P-I-N diode structure on the insulation layer. Absorptance of an intrinsic region in the P-I-N diode structure is varied when modulating light inputted to the waveguide. The absorption modulator obtains the improved characteristics, such as high speed, low power consumption, and small size, because it greatly reduces the cross-sectional area of the P-I-N diode structure.

12 Claims, 8 Drawing Sheets

ABSORPTION MODULATOR AND MANUFACTURING METHOD THEREOF

CROSS-REFERENCE TO RELATED APPLICATIONS

This U.S. non-provisional patent application claims priority under 35 U.S.C. §119 of Korean Patent Application No. 10-2008-0125330, filed on Dec. 10, 2008, the entire contents of which are hereby incorporated by reference.

BACKGROUND OF THE INVENTION

The present invention disclosed herein relates to an absorption modulator and a manufacturing method thereof.

Optical modulators are devices which change (modulate) the intensity, phase, polarization state, wavelength/frequency, or traveling direction of optical signals, which transmit information, by using external electrical, magnetic, mechanical, acoustic and optical units. Of those devices, a device which modulates the intensity or phase of an optical signal by using an electrical unit has been widely used because of its high operating speed (operating bandwidth) and controllability.

Representative examples of devices which modulate the intensity of light include a Mach-Zehnder modulator and an absorption modulator. The Mach-Zehnder modulator modulates a refractive index of a device material, caused by application of an electric field or current, and a phase shift of an optical signal into an intensity variation by using the interference effect of Mach-Zehnder interferometer. The absorption modulator controls (transmits or absorbs light) an optical absorption coefficient of a device material by applying an electric field or current to a device, and thus modulates the intensity of light propagated to the device material.

The Mach-Zehnder modulator has low temperature dependence and low wavelength dependence, but has relatively high optical loss and low yield. Meanwhile, the absorption modulator has low optical loss, but has high current consumption and low speed.

SUMMARY OF THE INVENTION

The present invention provides an absorption modulator having the improved characteristics, such as high speed, low power, miniaturization, low loss, and high yield, and a manufacturing method thereof.

Embodiments of the present invention provide absorption modulators including: a substrate; an insulation layer disposed on the substrate; and a waveguide having a P-I-N diode structure on the insulation layer, wherein absorptance of an intrinsic region in the P-I-N diode structure is varied when modulating light inputted to the waveguide.

In some embodiments, the P-I-N diode structure includes: the intrinsic region disposed on the insulation layer; a P-type region disposed on a first end of the intrinsic region; and an N-type region disposed on a second end of the intrinsic region opposite to the first end of the intrinsic region.

In other embodiments, the P-I-N diode structure includes: the intrinsic region disposed on the insulation region; P-type regions disposed on both ends of the intrinsic region; and an N-type region disposed on the top of the intrinsic region.

In still other embodiments, the P-I-N diode structure includes: the intrinsic region disposed on the insulation region; N-type regions disposed on both ends of the intrinsic region; and a P-type region disposed on the top of the intrinsic region.

In even other embodiments, when modulating the light inputted to the waveguide, a voltage or current applied to the P-I-N diode structure is pre-emphasized.

In yet other embodiments, the waveguide includes a photonic crystal waveguide and increases absorptance of the intrinsic region by lowering a light traveling speed.

In further embodiments, the waveguide is connected to a vertical grating coupler for connection to an external waveguide.

In still further embodiments, the insulation layer includes an oxide layer.

In even further embodiments, the absorption modulator is integrated with other devices into a single substrate.

In yet further embodiments, the waveguide includes a rib waveguide for a single mode operation.

In other embodiments, the rib waveguide includes: a protrusion portion remaining after a semiconductor layer is etched; and slaves disposed on both ends of the protrusion portion.

In still other embodiments, the cross-sectional area of the intrinsic region in the P-I-N diode structure is about 2 $\mu m^2$ or less.

In other embodiments of the present invention, methods for manufacturing an absorption modulation includes: forming a rib waveguide in a wafer, the wafer including a substrate, an insulation layer formed on the substrate, and a semiconductor layer formed on the insulation layer; performing an impurity doping on the rib waveguide; and varying absorptance of the rib waveguide, wherein the rib waveguide includes a central protrusion portion, and slaves formed on both ends of the protrusion portion.

In some embodiments, the impurity doping includes: performing a P-type doping on the slave formed on one end of the protrusion of the rib waveguide; and performing an N-type doping on the slave formed on the other end of the protrusion portion of the rib waveguide.

In other embodiments, the impurity doping includes: performing a P-type doping on the slaves formed on both ends of the rib waveguides; and performing an N-type doping on the top of the protrusion portion.

In still other embodiments, the impurity doping includes: performing an N-type doping on the slaves formed on both ends of the rib waveguide; and performing a P-type doping on the top of the protrusion portion.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain principles of the present invention. In the figures.

DETAILED DESCRIPTION OF PREFERRED EMBODIMENTS

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

An absorption modulator according to the embodiments of the present invention is implemented to vary the absorptance of an intrinsic region when incident light is inputted, the absorption modulator can be implemented in a small size and obtain good modulation characteristic.

Figure 1:
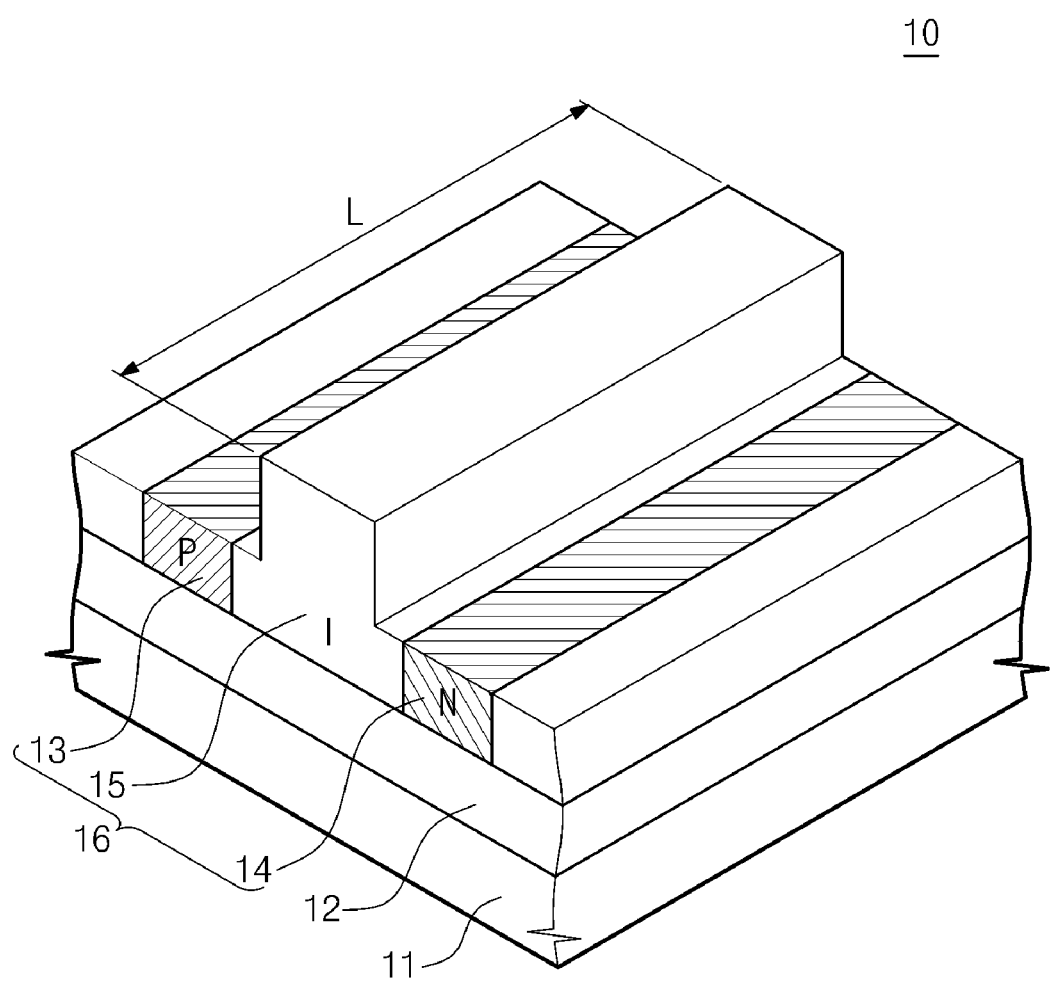
FIG. 1 is a perspective view of an absorption modulator according to an embodiment of the present invention.

FIG. 1 is a perspective view of an absorption modulator according to an embodiment of the present invention. Referring to FIG. 1, the absorption modulator according to the embodiment of the present invention includes a substrate 11, an insulation layer 12, semiconductor layers 13, 14, 15 disposed on the insulation layer 12, and a waveguide 16. The waveguide 16 includes a P-type doped region 13, an N-type doped region 14, and an intrinsic region 15. The absorption modulator according to the embodiment of the present invention is implemented to vary the absorptance of the intrinsic region in the P-I-N diode. To vary the absorptance of the intrinsic region may be achieved by various ways. For example, charges may be injected into the intrinsic region 15, moreover impulse may be applied on a transient time when applying a voltage or current. Hereinafter, the application of the impulse on the transient time will be referred to as a pre-emphasis.

The substrate 11 may be a silicon bulk substrate. The insulation layer 12 disposed on the substrate 11 may be an oxide layer.

The waveguide 16 may be implemented with a rib waveguide which is formed by etching the intrinsic semiconductor layer. The rib waveguide is a waveguide configured to operate in a single mode, and may include a central protrusion portion and slaves which are disposed on both ends of the central protrusion portion and have top surfaces lower than the central protrusion portion. P-type doping and N-type doping may be performed on the slaves of the rib waveguide, respectively. In this manner, as illustrated in FIG. 1, a P-I-N diode structure is implemented in a horizontal direction. Meanwhile, the etching depth in configuring the rib waveguide and the etching depth of the doped region may be different.

The waveguide 16 may be formed in the silicon bulk substrate by oxygen implant under only a region where the waveguide will be formed.

The absorption modulator according to the embodiment of the present invention is implemented to vary the absorptance of the intrinsic region 15, that is, a region through which light is transmitted in the rib waveguide. Specifically, the absorption modulator according to the embodiment of the present invention can obtain good modulation characteristic, using the cross-sectional area of the intrinsic region 15 is 2 $\mu m^2$ or less.

Generally, the absorption modulator is an optical modulator which uses free carrier absorption. The free carrier absorption refers to a phenomenon which absorbs light energy when electrons or holes receive light. Using such a phenomenon, the intensity of light is modulated.

The waveguide according to the embodiment of the present invention has a structure in which the P-I-N diode 13, 15 and 14 is formed. If a current is applied, electrons or holes are accumulated in the intrinsic region 15, and the absorption of light guided along the intrinsic region 15 is increased, so that the output power at an output terminal is reduced.

If a voltage is applied to the P-I-N diode 13, 15 and 14 in a reverse direction and thus the electrons and holes are discharged from the intrinsic region 15, the absorption of light guided along the intrinsic region 15 is reduced. Therefore, the output power at the output terminal becomes greater than that when the current is applied.

When light passes through the waveguide having a length of L, an attenuation occurs as expressed in Equation (1) below.

$$\Delta I = \exp(-\Delta \alpha \cdot \Gamma \cdot L) \quad (1)$$

Where $\Delta I$ represents variation in the intensity of output light, that is, a ratio of the intensity of output light when the current is applied, to the intensity of output light when no current is applied, $\Delta \alpha$ represents variation of an absorption coefficient, and $\Gamma$ represents a confinement factor of light confined in the absorption layer among the total light.

$\Delta \alpha$, the variation of $\alpha$ in Equation (1), is expressed as Equation (2) below.

$$\Delta \alpha = 8.5 \times 10^{-18} * \Delta N + 6.0 \times 10^{-18} * \Delta P \quad (2)$$

Where $\Delta N$ and $\Delta P$ represent variations in concentration of the electrons and holes per $cm^{-3}$, respectively.

$\Delta N$ and $\Delta P$ may be caused by the P-I-N diode. For example, in the device acting as the waveguide and the P-I-N diode, if the voltage of the P-I-N diode is varied, the current flowing through the diode is varied and thus $\Delta N$ and $\Delta P$ occur in the intrinsic region 15.

In this case, the relationship of the current (I) flowing through the diode, $\Delta N$ and $\Delta P$ is expressed as Equation (3) below.

$$\Delta N = \Delta P = \frac{I \cdot \tau}{q \cdot V} = \frac{I \cdot \tau}{q \cdot L \cdot A} \quad (3)$$

Where I represents the current applied to the diode, $\tau$ represents a lifetime which is an average time taken for the electrons and holes to recombine with each other in the intrinsic region 15, q represents the amount of charges of electrons, V represents the volume of the intrinsic region 15 in the entire diode, and A represents the cross-sectional area of the intrinsic region 15.

Using Equations (1), (2) and (3) to correlate parameters of the diode and the variation in the intensity of light, Equation (4) below is derived.

$$\Delta I = \exp\left(-14.5 \times 10^{-18} \cdot \frac{I \cdot \tau \cdot \Gamma}{q \cdot A}\right) \quad (4)$$

As can be seen from Equation (4), as the cross-sectional area of the intrinsic region 15 is smaller, the variation in the output light is larger even at the same current. Furthermore, as the cross-sectional area is small, a desired loss variation can be obtained with a small current.

A typical absorption modulator consumes a large amount of current because the diode has a large cross-sectional area. On the contrary, the absorption modulator according to the embodiment of the present invention is implemented to use a small current because small cross-sectional area gives a high carrier concentration. Consequently, the absorption modulator according to the embodiment of the present invention is smaller in the cross-sectional area than the typical absorption modulator. This means that the length (L) of the optical modulator may be short. Therefore, the absorption modulator according to the embodiment of the present invention is advantageous to manufacturing a small-sized optical modulator.

The small-sized optical modulator is advantageous to integrating with other devices into the same chip. Since the current semiconductor chips support multi-channel signal transmission, a plurality of transmitters are mounted on a single chip. When the optoelectronic device for multi-channel optical transmission is integrated into the semiconductor chip, it is advantageous that the size of the optoelectronic device is smaller in size.

The cross-sectional area of the typical absorption modulator is ~80 μm². A large amount of current must flow in order to obtain enough charge density in such a size. On the contrary, the absorption modulator according to the embodiment of the present invention can be implemented with a diode having a cross-sectional area of 2 μm² or less. According to the embodiment of the present invention, it is possible to obtain good modulation characteristic even when the absorption modulator is 250 μm in length and a current is about 10 mA in such a cross-sectional area.

Furthermore, the absorption modulator according to the embodiment of the present invention is configured so that the current has only to flow through the diode, which is the simplest structure of the semiconductor device, without mounting additional devices. Therefore, when manufactured in practice, the yield of the absorption modulator can be increased. In particular, in case where several tens of multi-channels must be integrated, the yield of the absorption modulator will be more important.

Furthermore, the absorption modulator according to the embodiment of the present invention has a low propagation loss when no current flows through the diode. For example, a silicon rib waveguide having a thickness of 220 nm and a width of 500 nm has the loss of about 2 dB/cm.

Moreover, according to the experiment, the loss of 10 dB was obtained in the waveguide structure having a length of 250 μm according to the embodiment of the present invention when current is applied. At such a loss, a sufficient effect can be obtained from the absorption modulator. In other words, according to the embodiment of the present invention, a 250 μm absorption modulator can be manufactured. When the waveguide loss is 2 dB/cm at a length of 250 μm, on-chip loss is about 0.05 dB, which is a very small loss.

In the absorption modulator according to the embodiment of the present invention, the waveguide diode having a small cross-sectional area is manufactured in order to further increase the efficiency than the typical method while using the diode which is the simplest structure.

Meanwhile, as the cross-sectional area of the waveguide in the absorption modulator is smaller, a coupling loss may increase at an external connection such as an optical fiber. In this case, the absorption modulator according to the embodiment of the present invention can be implemented by integrating with a vertical grating coupler.

Figure 2A:
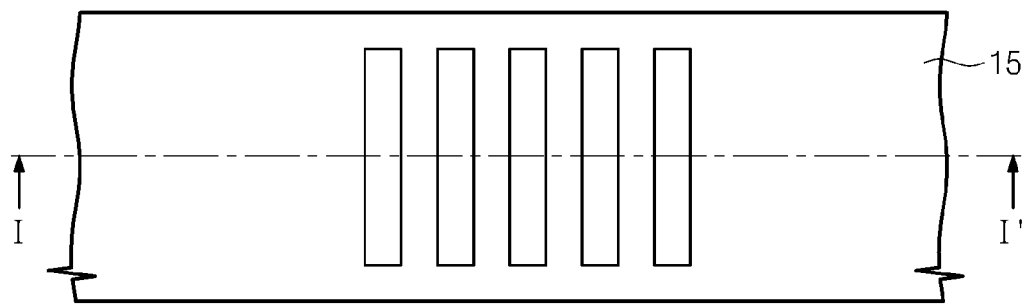
FIG. 2A is a top view of a vertical grating coupler connected to the absorption modulator according to an embodiment of the present invention.
Figure 2B:
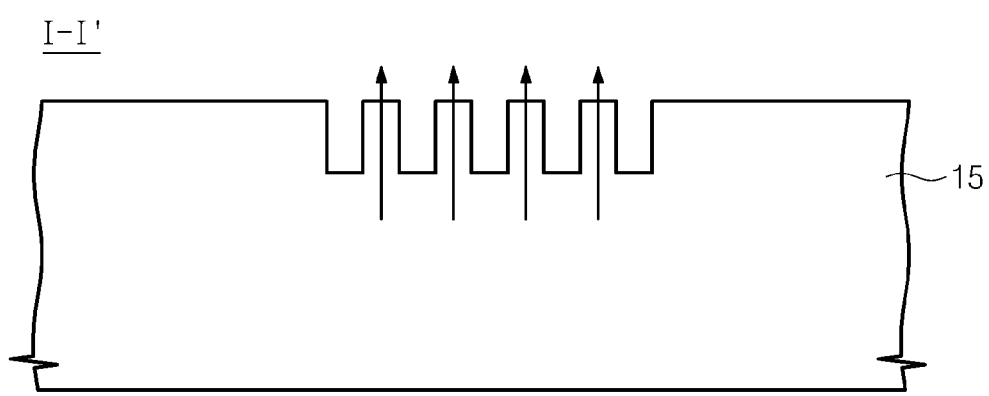
FIG. 2B is a sectional view taken along line I-I' of FIG. 2A.

FIG. 2A is a top view of a vertical grating coupler according to an embodiment of the present invention. Referring to FIG. 2A, the vertical grating is disposed at the end and top of the intrinsic region 15. FIG. 2B is a sectional view taken along line I-I' of FIG. 2A. Referring to FIG. 2B, the vertical grating has a concave-convex shape on the intrinsic region 15, and the modulated light is outputted to the outside through the vertical grating coupler.

An operating speed is one of the most important characteristics which must be considered in the optical modulator. The variation speed of the densities of the electrons and holes in the P-I-N diode depends on the carrier lifetime. The density variation of the electrons and holes in the P-I-N diode is expressed as Equation (5) below.

$$\frac{dQ(t)}{dt} = \frac{V(t) - V_{turn-on}}{R} - \frac{Q(t)}{\tau} \quad (5)$$

Meanwhile, it has been known that the carrier lifetime in the intrinsic region of the P-I-N diode is about 1 nsec to about 2 nsec.

Figure 3:
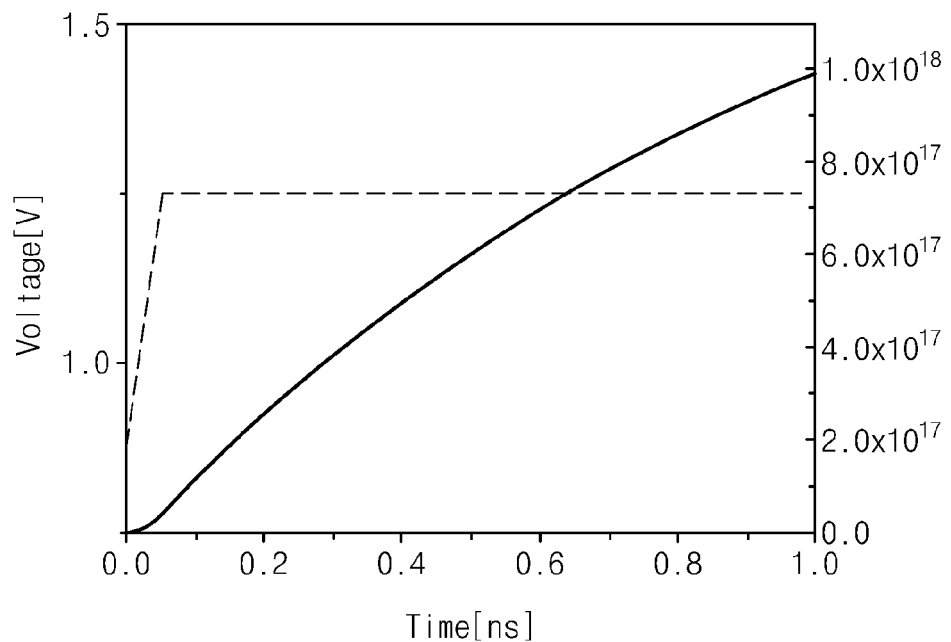
FIG. 3 is a graph illustrating the variation in the amount of charges with respect to time when a typical signal is applied to a P-I-N diode.

FIG. 3 is a graph illustrating the variation in the density of the electrons and holes with respect to the input voltage in view of time. Referring to FIG. 3, after the input voltage reaches a constant level, the density of the carrier such as the electrons or holes still remains in a transient state even though time of 1 nsec is passed. This means that it is not easy to implement even 1-Gbps operation.

The operating speed of the P-I-N diode is dominated by the carrier lifetime, and it does not exceed 1 Gbps. To overcome such a limitation, a pre-emphasis method is used herein.

Figure 4:
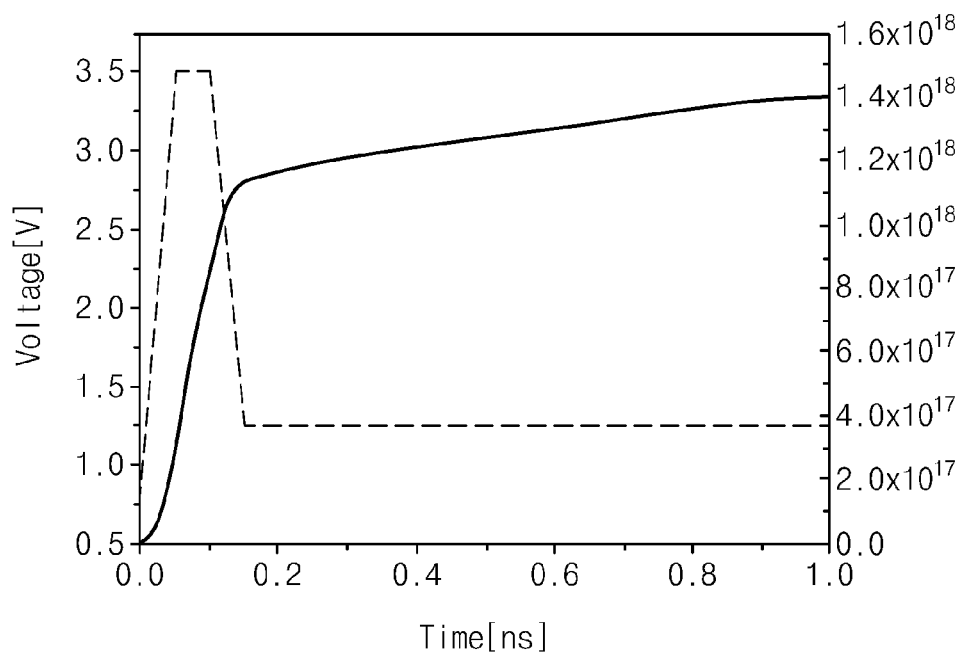
FIG. 4 is a graph illustrating the variation in the amount of charges when a pre-emphasized signal is applied to a P-I-N diode.

FIG. 4 is a graph illustrating the variation in the density of the carrier in case where a signal with impulse voltage added thereto is applied when the input voltage of the diode is in the transient state. Referring to FIG. 4, if the pre-emphasized voltage is applied to the diode, the transient time is remarkably reduced compared with that of FIG. 3.

Figure 5:
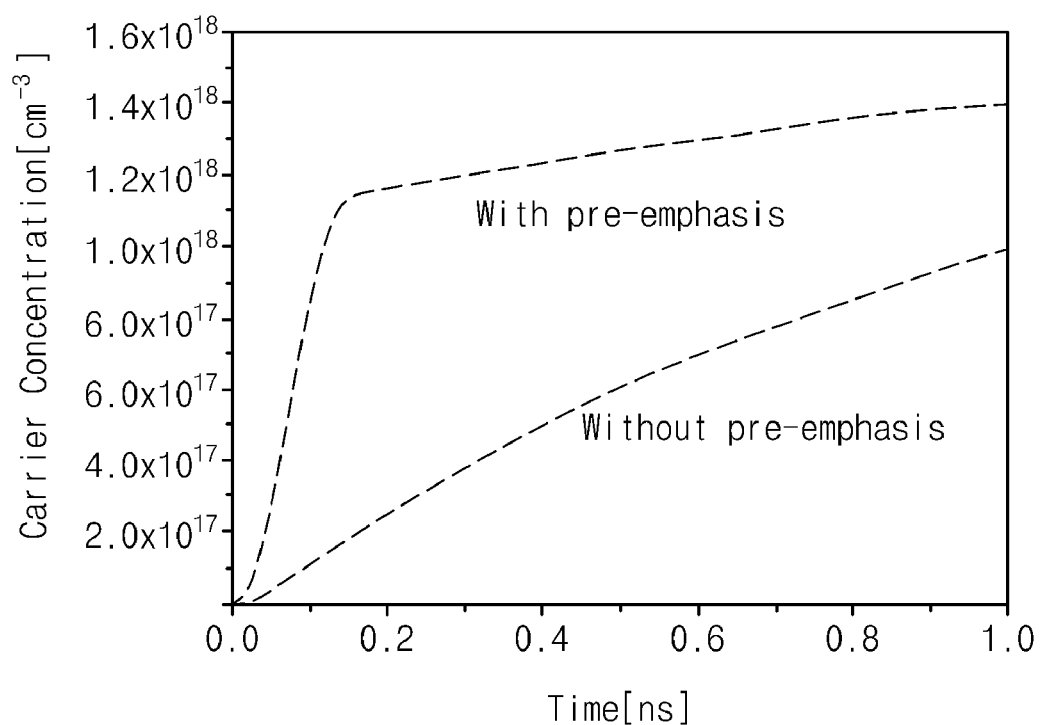
FIG. 5 is a graph illustrating comparison of carrier variations with respect to time, when a typical signal is applied to a P-I-N diode and when a pre-emphasized signal is applied to a P-I-N diode.

FIG. 5 is a graph illustrating comparison of carrier variations when the pre-emphasis is performed and when no pre-emphasis is performed. Referring to FIG. 5, if the pre-emphasis method is used according to the embodiment of the present invention, the operating speed of the P-I-N diode is not limited by the carrier lifetime of about 1 nsec to about 2 nsec.

Meanwhile, the carrier lifetime in the intrinsic region 15 can be reduced using other methods, in addition to the emphasis method. For example, impurities such as Pt or Au may be added to the intrinsic region 15.

To further reduce the size of the absorption modulator, a slow light phenomenon may be used. If light passes through the waveguide at a low speed, absorption occurs more than that when light passes through the waveguide at high speed.

This is a phenomenon that can be obtained when the waveguide is a photonic crystal (PC) waveguide. In the PC waveguide, the speed of light tends to be lowered near the forbidden bandgap. If this phenomenon is applied to the absorption modulator, a small-sized optical modulator can be manufactured.

Meanwhile, for the absorption modulator of FIGS. 1 through 5, the lateral diode structure has been described. However, the present invention is not limited to the lateral diode structure. The absorption modulator according to the embodiment of the present invention may also be implemented with a vertical diode structure.

Figure 6:
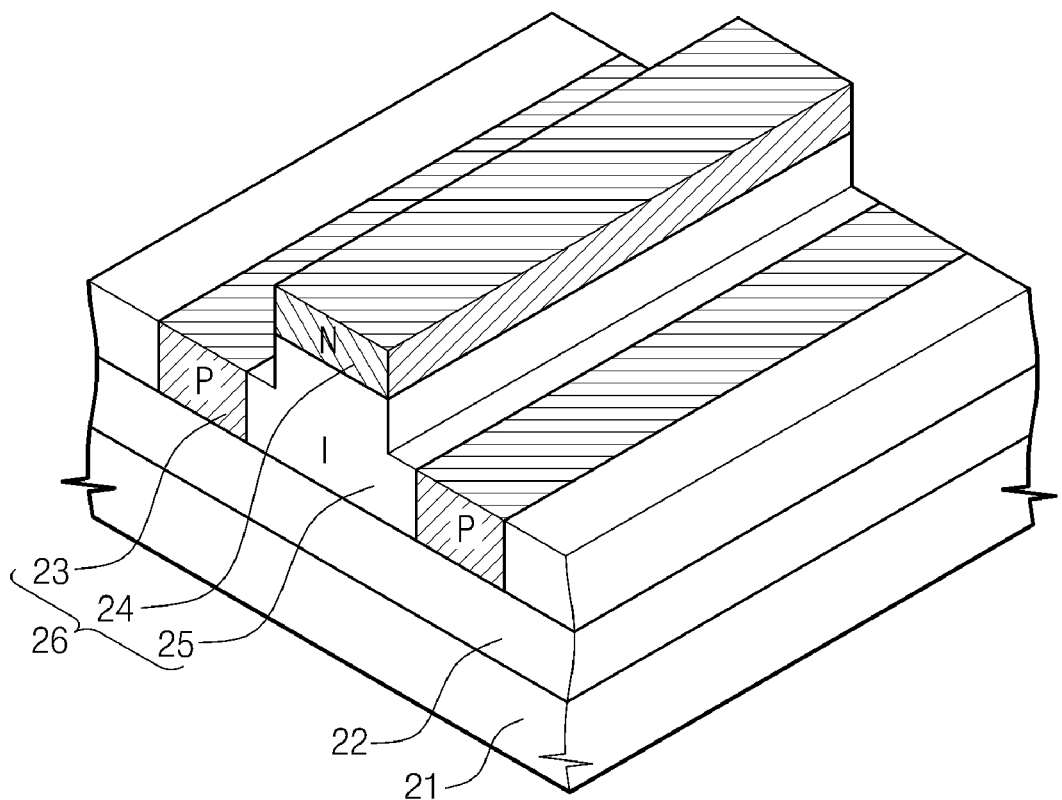
FIG. 6 is a perspective view of an absorption modulator according to another embodiment of the present invention.

FIG. 6 is a perspective view of an absorption modulator according to another embodiment of the present invention. Referring to FIG. 6, the absorption modulator 20 includes a waveguide 26 having a vertical diode structure 23, 25 and 24. The vertical diode structure 23, 25 and 24 includes a P-type doped region 23, an intrinsic region 25, and an N-type doped region 24. The P-type doped region 23 is disposed at slaves formed on both ends of the intrinsic region 25, and the N-type doped region 24 is disposed on the top of the intrinsic region 23. Charges flow from the P-type doped region 23 to the N-type doped region 24. In FIG. 6, the N-type doped region 24 is disposed on the intrinsic region 25. However, the present invention is not limited to the above structure of FIG. 6. The N-type doped region 24 may be disposed on the slaves formed on both ends of the intrinsic region 25, and the P-type doped region 23 may be disposed on the top of the intrinsic region 23.

Figure 7:
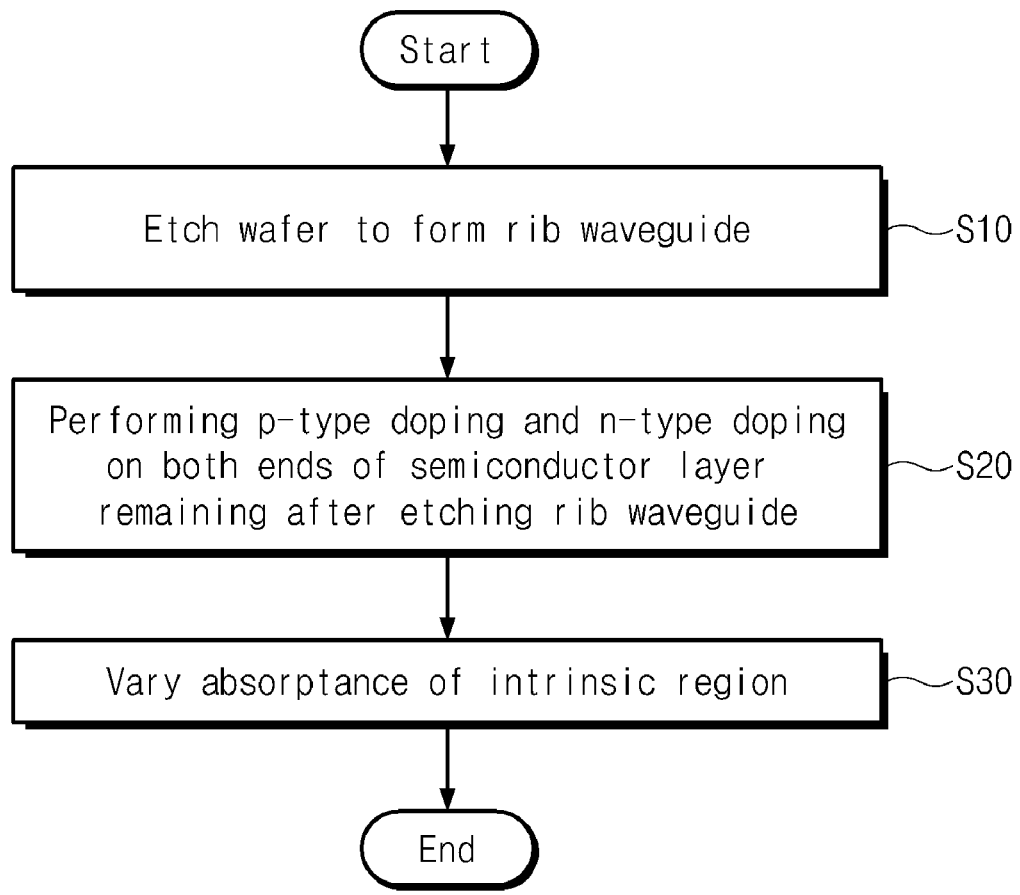
FIG. 7 is a flowchart illustrating a method for manufacturing an absorption modulator according to an embodiment of the present invention.
Figure 8:
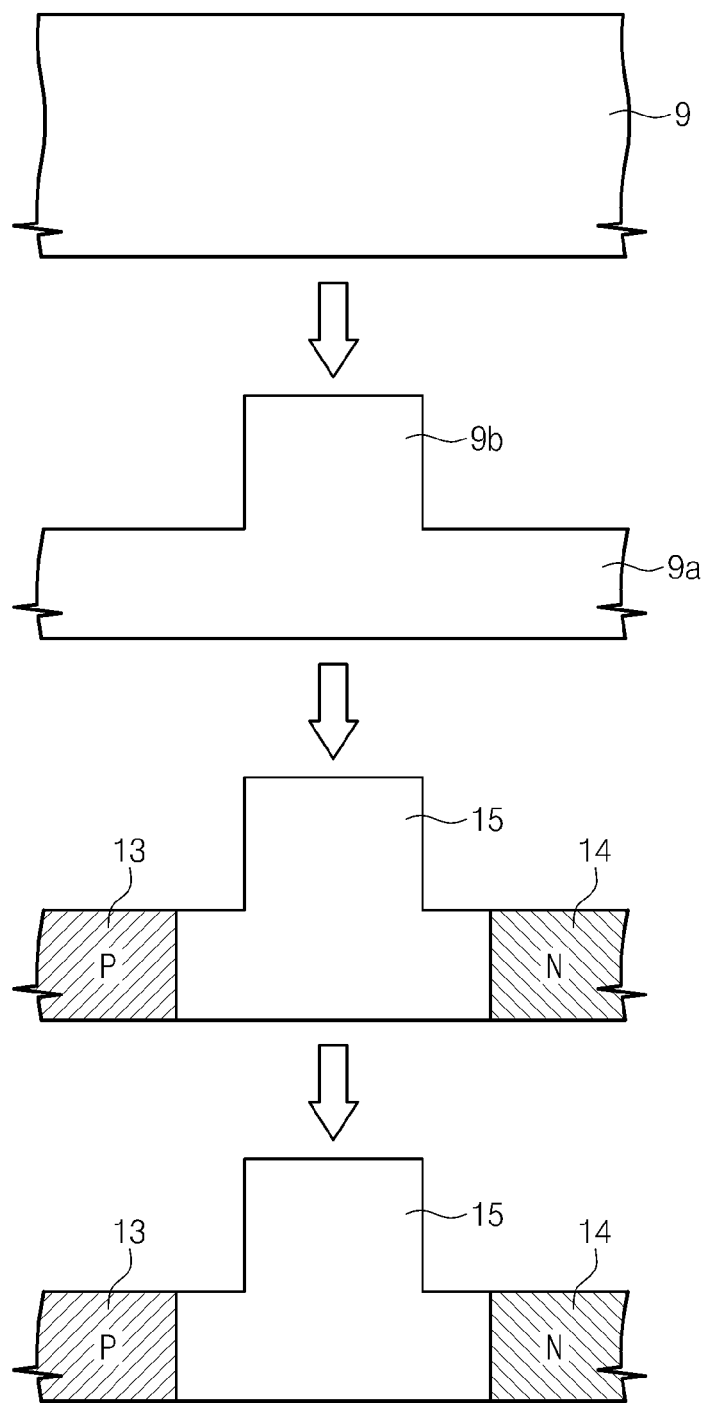
FIG. 8 illustrates a method for manufacturing the absorption modulator according to an embodiment of the present invention.

FIG. 7 is a flowchart illustrating a method for manufacturing a waveguide of an absorption modulator according to an embodiment of the present invention. FIG. 8 illustrates a method for manufacturing the waveguide of the absorption modulator according to an embodiment of the present invention.

The method for manufacturing the waveguide of the absorption modulator will be described below with reference to FIGS. 1, 7 and 8.

A wafer with a substrate/insulation layer/semiconductor layer is etched to form a rib waveguide (S110). For convenience of explanation, the wafer having only an intrinsic semiconductor layer 9 is illustrated. The semiconductor layer remaining after the etching includes a central protrusion portion 9b, and slaves 9a formed on both ends of the central protrusion portion 9a. A P-type doping and an N-type doping are performed on the slaves 9a (S120), respectively. In this manner, a waveguide having a lateral P-I-N diode structure 13, 15 and 14 is formed. To enhance the speed of absorption modulator, impurities such as Pt or Au is doped into the intrinsic region 15. In this manner, a new intrinsic region with a varied carrier life-time is formed. Consequently, the waveguide with the short life-time is formed.

Figure 9:
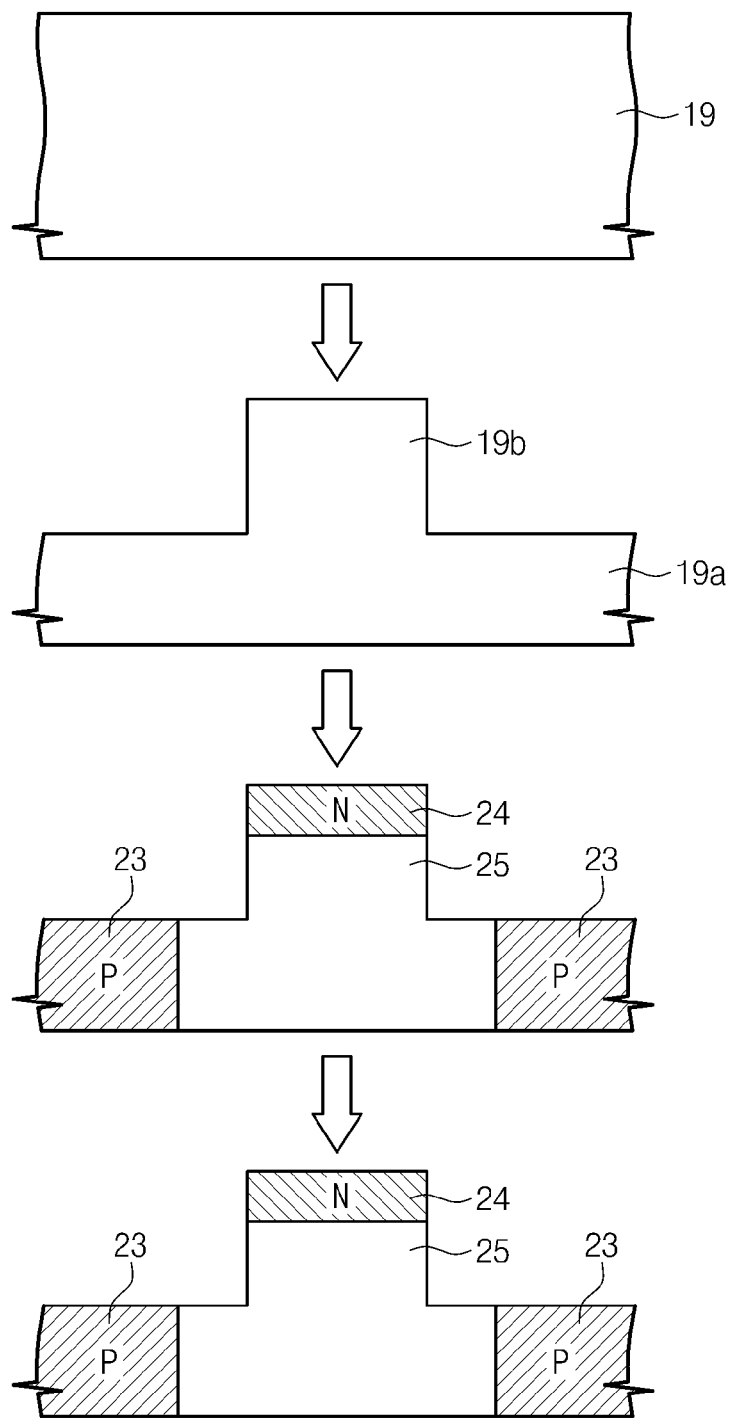
FIG. 9 illustrates a method for manufacturing the absorption modulator according to another embodiment of the present invention.

FIG. 9 illustrates a method for manufacturing a waveguide of an absorption modulator according to another embodiment of the present invention. The method for manufacturing the waveguide of the absorption modulator will be described below with reference to FIGS. 1, 7 and 9.

A wafer with a substrate/insulation layer/semiconductor layer is etched to form a rib waveguide (S110). For convenience of explanation, the wafer having only an intrinsic semiconductor layer 19 is illustrated. The semiconductor layer remaining after the etching includes a central protrusion portion 19b, and slaves 19a formed on both ends of the central protrusion portion 19a. A P-type doping is performed on the slaves 19a (S120). Also, an N-type doping is performed on the top of the protrusion portion of the semiconductor layer remaining after the etching. In this manner, a waveguide having a lateral P-I-N diode structure 23, 25 and 24 is formed. To enhance the speed of absorption modulator, impurities such as Pt or Au is doped into the intrinsic region 25. In this manner, a new intrinsic region with a varied carrier life-time is formed. Consequently, the waveguide with the short life-time is formed.

As described above, the absorption modulator having the small cross-sectional area can be implemented by varying the absorptance of the intrinsic region. Therefore, the absorption modulator according to the embodiments of the present invention can realize the optoelectronic device which has no wavelength selectivity, operates at high speed and low power, and has ultra-small size, low loss and high yield. The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An absorption modulator comprising:
   a substrate;
   an insulation layer disposed over the substrate; and
   a waveguide having a P-I-N diode structure on the insulation layer, wherein absorptance of an intrinsic region in the P-I-N diode structure is varied when modulating light inputted to the waveguide,
   wherein the P-I-N diode structure comprises the intrinsic region disposed over the insulation layer, a first P-type region disposed adjacent to a first end of the intrinsic region, a second P-type region disposed adjacent to a second end of the intrinsic region, and an N-type region disposed over the intrinsic region.

2. The absorption modulator of claim 1, wherein a transverse cross-sectional area of the intrinsic region in the P-I-N diode structure is about 2 $\mu m^2$ or less.

3. The absorption modulator of claim 1, wherein when modulating the light inputted to the waveguide, a voltage or current applied to the P-I-N diode structure is pre-emphasized.

4. The absorption modulator of claim 1, wherein the waveguide comprises a photonic crystal waveguide and increases absorptance of the intrinsic region by lowering a light traveling speed.

5. The absorption modulator of claim 1, wherein the waveguide is coupled to a vertical grating coupler to communicate with an external waveguide.

6. The absorption modulator of claim 1, wherein the insulation layer comprises an oxide layer.

7. The absorption modulator of claim 1, wherein the substrate comprises a silicon bulk substrate, and the waveguide is formed over a selectively oxygen implanted region.

8. The absorption modulator of claim 1, wherein the absorption modulator is integrated with other devices into a single substrate.

9. The absorption modulator of claim 1, wherein the waveguide comprises a rib waveguide for a single mode operation.

10. The absorption modulator of claim 9, wherein the rib waveguide comprises:
    a protrusion portion remaining after a semiconductor layer is etched;
    a first slave disposed adjacent to a first end of the protrusion portion; and a second slave disposed adjacent to a second side of the protrusion portion.

11. The absorption modulator of claim 1, wherein impurities are doped into the intrinsic region in order to increase speed of absorption modulator.

12. A method for manufacturing an absorption modulator, comprising:
  forming a rib waveguide in a wafer, the wafer comprising a substrate, an insulation layer formed over the substrate, and a semiconductor layer formed over the insulation layer;
  performing an impurity doping on the rib waveguide; and varying absorptance of the rib waveguide, wherein the rib waveguide comprises a central protrusion portion, a first slave disposed on a first side of the protrusion portion, and a second slave disposed on a second side of the protrusion portion,
  wherein the impurity doping comprises performing a P-type doping on the first slave and the second slave and performing an N-type doping on the top of the protrusion portion.

* * * * *